United States Patent [19]

Honda et al.

[11] 4,324,701

[45] Apr. 13, 1982

[54] RECTANGULAR-SOLID PACKAGED CATALYST ASSEMBLY

[75] Inventors: Mitsuyasu Honda; Yoshihiro Shiraishi; Toru Seto, all of Hiroshima, Japan

[73] Assignee: Mitsubishi Jukogyo Kabushiki Kaisha, Japan

[21] Appl. No.: 212,559

[22] Filed: Dec. 3, 1980

[30] Foreign Application Priority Data

Dec. 13, 1979 [JP] Japan .................. 54-161922

[51] Int. Cl.³ ............................. B01J 12/00; F01N 3/28
[52] U.S. Cl. ................................ 252/477 R; 422/180; 422/222; 428/116
[58] Field of Search .................. 252/477 R; 422/280, 422/222, 116; 423/212

[56] References Cited

U.S. PATENT DOCUMENTS 3,565,830  2/1971  Keith et al. .................. 423/212 X
3,852,042 12/1974  Wagner ........................ 422/180 X
3,998,599 12/1976  Fedor ........................... 422/180

FOREIGN PATENT DOCUMENTS 2921686  1/1980  Fed. Rep. of Germany ...... 422/180

*Primary Examiner*—G. O. Peters
*Attorney, Agent, or Firm*—McGlew and Tuttle

[57] ABSTRACT

A rectangular-solid packaged catalyst assembly made up of a plurality of rectangular-solid unit catalysts stacked and assembled together, the unit catalysts having a honeycomb structure with a multiplicity of gas passages each. Heat-resistant packings are used to cover at least the vertices and the neighboring areas of the faces of the unit catalysts other than the gas-passage faces and also to cover the edges of the gas-passage faces surrounding the gas passages, the packings being integrally secured to the unit catalysts and packaged together in a rectangular-solid housing. Retaining strips are placed over the packings on the edges of the gas-passage faces on at least either the gas inlet or outlet ends of the unit catalysts and are securely attached to the housing.

3 Claims, 10 Drawing Figures

RECTANGULAR-SOLID PACKAGED CATALYST ASSEMBLY

FIELD AND BACKGROUND OF THE INVENTION

This invention relates to a packaged honeycomb catalyst assembly for use in a solid-gas catalytic reactor.

A conventional practice for packaging catalysts has consisted in forming unit catalysts of a honeycomb structure, relatively small in size, uniform in length, and having gas passages of a given cross-sectional contour, e.g., hexagonal, square, or triangular, and then stacking those unit honeycomb catalysts in layers within a housing to a packaged form. The unit catalysts, formed by extrusion or other similar technique, often are distorted, deflected, shrunk, or otherwise deformed. When a plurality of such deformed unit catalysts are stacked in the manner described, the individual catalysts, having unflattened outer walls as shown in FIG. 1, tend to be subjected to excess loads at the vertices of the rectangular solids, i.e., at the four corners (indicated at A). In the absence of any protective restraint, the catalysts are likely to move up and down, left and right, with vibrations caused during transportation or at the time of installation inside a reactor. Especially, in the axial direction of their gas passages, they are not fixed and can easily slip out of place and be damaged. The catalyst fragments or bits that have resulted from the damages can partly cover or close the gas passages, inviting dust accumulation and eventual choking.

SUMMARY OF THE INVENTION

The present invention provides a packaged catalyst assembly in the form of a rectangular solid with improvements over the conventional packaged catalysts.

This objective of the invention is attained by providing a rectangular-solid packaged catalyst assembly which comprises a plurality of rectangular-solid unit catalysts stacked and assembled together, said unit catalysts having a honeycomb structure with a multiplicity of gas passages each, characterized by heat-resistant packings used to cover at least the vertices and the neighboring areas of the faces of the unit catalysts other than the gas-passage faces thereof and also to cover the edges of the gas-passage faces surrounding the gas passages, said packings being integrally secured to said unit catalysts and packaged together in a rectangular-solid housing, and retaining strips placed over the packings on the edges of the gas-passage faces on at least either the gas inlet or outlet ends of said unit catalysts and securely attached to said housing.

The above and other objects, features, and advantages of the invention will become more apparent from the following detailed description taken in conjunction with the accompanying drawings, wherein:

With reference to these drawings the invention will now be described in detail as embodied in a honeycomb catalyst assembly for use in dry denitrification of gases.

Figure 1:
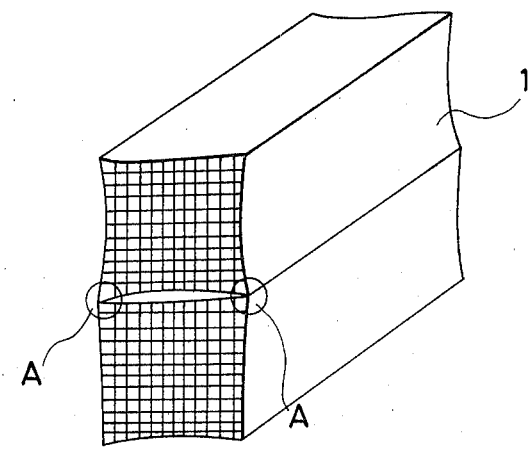
FIG. 1 is a perspective view of unit catalysts stacked in a conventional way.
Figure 2:
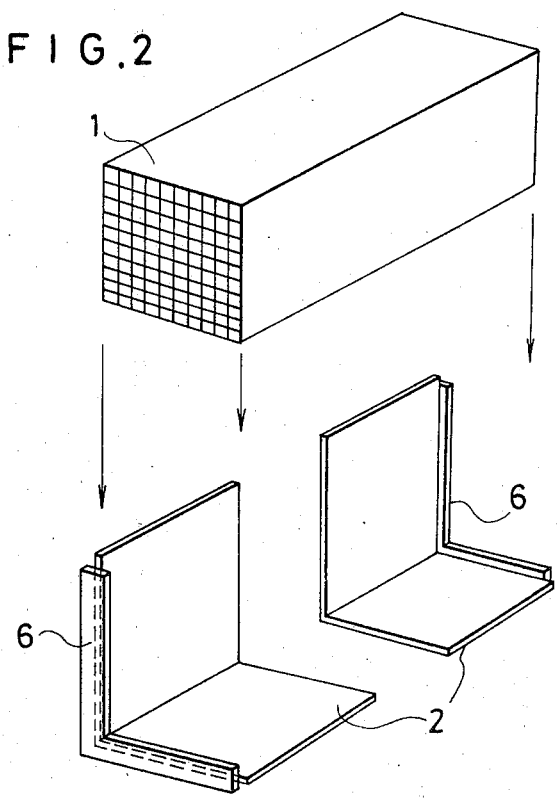
FIG. 2 is an exploded view showing a combination of a unit catalyst and packings according to the invention.

FIG. 2 illustrates a typical way of providing protection for a unit catalyst in accordance with the invention. A pair of L-shaped packings 2, formed of heat-resistant material, such as asbestos or "Kaowool" (trademark for an alumina-silica ceramic fiber marketed by Babcock & Wilcox Co.), are spaced apart a sufficient distance to support the unit catalyst 1 at the upstream and downstream end portions of its gas passages. The unit catalyst is then placed on and secured to the packings. This procedure is repeated until the desired number of unit catalysts have been stacked for packaging.

Figure 3:
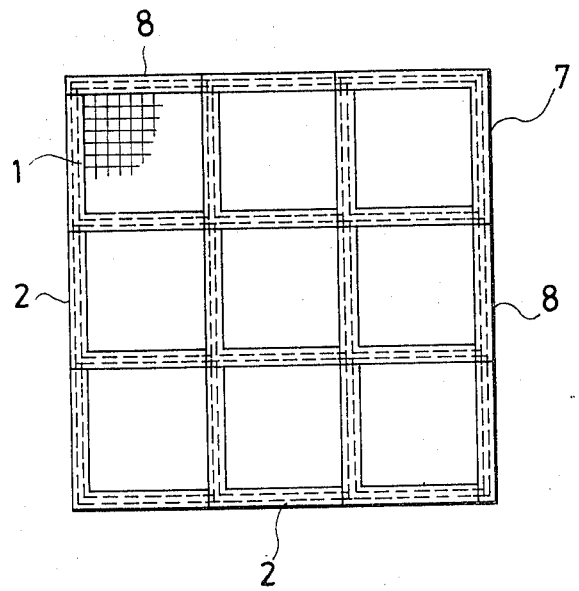
FIG. 3 is an end view of an assembly in which unit catalysts and heat-resistant packings are combined and stacked together in parallel with the direction of gas flow in accordance with the invention.
Figure 4:
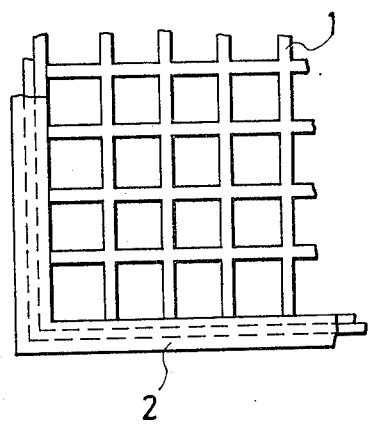
FIG. 4 is an enlarged view of a fragment of the assembly showing the heat-resistant packings and neighboring parts.

In FIG. 3 there are shown a plurality of unit catalysts 1 and a corresponding number of compression-molded, heat-resistant packings 2, the catalysts being assembled in parallel and stacked in layers, with their gas passages oriented in the direction of gas flow. To the upper right corner of the assembly is attached an inverted-L-shaped, heat-resistant packing 7 and to the top center and right side of the assembly, flat heat-resistant packings 8. As better shown in FIG. 4, the heat-resistant packings 2 are desired to be substantially as thick as the outer walls of the unit catalysts, ranging in thickness from 2 to 3 mm, to protect the end portions of the catalysts and keep them from being deformed perpendicularly to the gas flow direction. Also, as FIG. 2 indicates, each packing 2 has a retaining edge 6 with which to avoid slipping of the packing out of place in the gas flow direction. The packings 7 and 8, too, are edged likewise.

Figure 5:
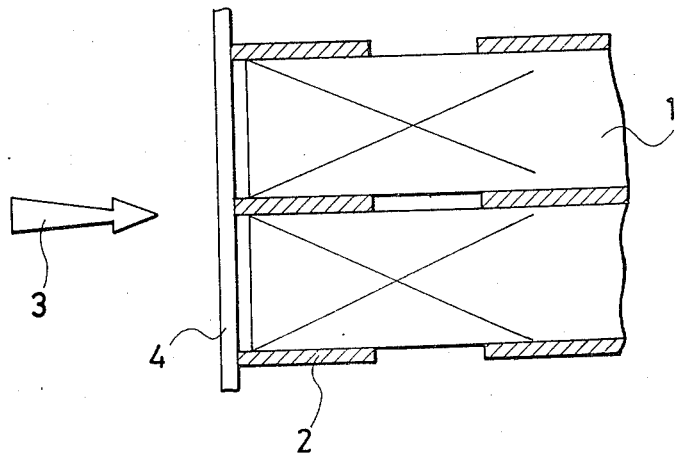
FIG. 5 is a sectional view taken on the line B—B of FIG. 6.
Figure 6:
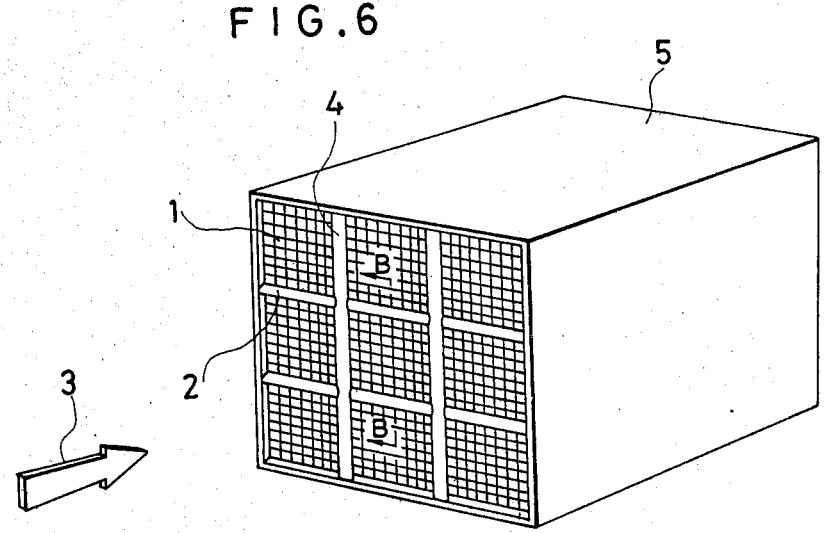
FIG. 6 is a perspective view of a rectangular-solid, packaged catalyst assembly embodying the invention.

FIG. 5 is a side sectional view of an assembly of unit catalysts 1 and heat-resistant packings 2 stacked in combination, as seen specifically in the direction of the arrows B—B in FIG. 6

Retaining strips 4 are integrally secured to the housing of the assembly. They are used to apply added restraint on the unit catalysts to retain them in place. To this end the strips are attached to the exposed edges of the packings 2, at the gas inlet and outlet ends of the catalyst assembly where the reactor is so designed that the gas flows horizontally through it, or at the outlet end of the assembly where the gas flows vertically.

FIG. 6 shows a packaged catalyst assembly according to the invention. It consists of unit catalysts 1 and heat-resistant packings 2, 7, 8 assembled together in layers parallel to the gas flow within a housing 5 and secured in place by retaining strips 4. In FIGS. 5 and 6 the arrows 3 indicate the direction in which the gas flows.

Figure 7:
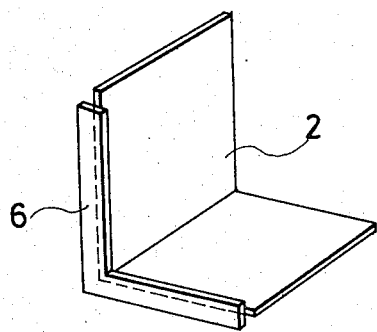
FIGS. 7 to 10 show, in perspective, varied forms of heat-resistant packings according to the invention.
Figure 8:
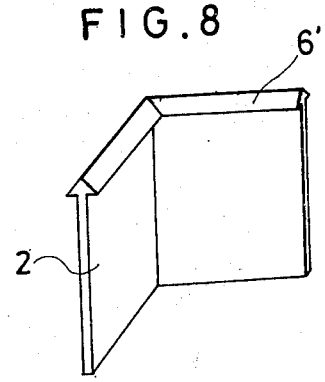

FIGS. 7 and 8 show heat-resistant packings 2 compression-molded to varied shapes in accordance with the invention. These shapes are suitably chosen, for example, depending on the configurations of the unit catalyst and whether the catalyst assembly is installed horizontally or vertically. Generally, for the horizontal arrangement the packing shown in FIG. 7 is used and for the vertical arrangement, the packing of FIG. 8 whose edge 6' is triangular in section to minimize the deposition of dust from the incoming gas.

Figure 9:
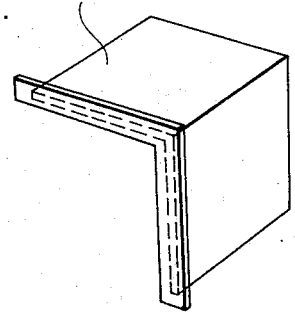
Figure 10:
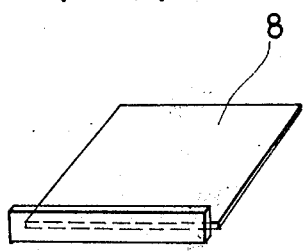

FIG. 9 shows a similarly compression-molded, heat-resistant packing 7 and FIG. 10, also a heat-resistant packing 8, both adapted for the horizontal arrangement.

As described hereinabove, the present invention provides a packaged catalyst assembly in which a number of rectangular-solid unit catalysts of a honeycomb structure, relatively small in size, are stacked in parallel with the gas passages thereof in a rectangular-solid housing, characterized in that compression-molded, L-shaped packings of heat-resistant material are attached to the upstream and downstream end portions of the gas passages of the unit catalysts, and retaining strips are placed over the packings on the edges of the gas-passage faces on either the gas inlet and outlet ends or only the outlet ends of the unit catalysts and are securely attached to the housing. This construction minimizes the slipping of the unit catalysts out of place in the vertical, sidewise, and gas-passage directions during transportation and at the time of mounting in and dismounting from the reactor. Accordingly, the catalyst damage is limited and the cost is saved to a great practical advantage.

What is claimed is:

1. An improved rectangular-solid catalyst assembly of the type having a plurality of rectangular-solid unit catalysts stacked and assembled together, the unit catalysts having a honeycomb structure with a multiplicity of gas passages each extending from a gas inlet end to a gas outlet end, the improvement comprising, in combination therewith, heat-resistant packings covering at least the vertices and the neighboring peripheral areas of the faces of the unit catalysts other than the gas-passage faces thereof and also covering the edges of the gas-passage faces surrounding the gas passages, a rectangular-solid housing, said packings being integrally secured to said unit catalysts and packed together in said rectangular-solid housing, and retaining strips placed over the edges of the gas-passage faces on at least one of said unit catalysts and securely attached to said housing:

2. An improved rectangular-solid package catalyst assembly, as claimed in claim 1, wherein said heat-resistant packings comprise L-shaped members provided upstream and downstream of gas passage surface of a unit catalyst, said unit catalyst being placed on said heat-resistant packings, said unit catalyst and said heat-resistant packings being incorporated alternately in stacked and packed condition, a second type heat-resistant packing comprising a reverse L-shaped member provided in the corner part right above of said packaged assembly and a flat heat-resistant packing at the uppermost part and right lateral part thereof respectively.

3. An improved rectangular-solid package catalyst assembly, as claimed in claims 1 or 2, wherein said heat-resistant packings have a thickness approximately as thick as the outer walls of the unit catalysts.

* * * * *